United States Patent [19]

Peterson et al.

[11] Patent Number: 4,814,980
[45] Date of Patent: Mar. 21, 1989

[54] CONCURRENT HYPERCUBE SYSTEM WITH IMPROVED MESSAGE PASSING

[75] Inventors: John C. Peterson, Alta Loma; Jesus O. Tuazon, Anaheim; Don Lieberman, Cupertino; Moshe Pniel, West Covina, all of Calif.

[73] Assignee: California Institute of Technology, Pasadena, Calif.

[21] Appl. No.: 846,721

[22] Filed: Apr. 1, 1986

[51] Int. Cl.$^4$ .................. G06F 3/00; G06F 13/00; G06F 13/20; G06F 13/38
[52] U.S. Cl. ............................................. 364/200
[58] Field of Search ... 364/200 MS File, 300 MS File, 364/900 MS File, 300; 370/59-62, 92-95

[56] References Cited

U.S. PATENT DOCUMENTS

| | | | |
|---|---|---|---|
| 3,970,993 | 7/1976 | Finnila | 364/200 |
| 3,979,728 | 9/1976 | Reddaway | 364/200 |
| 4,229,790 | 10/1981 | Gilliland et al. | 364/200 |
| 4,247,892 | 1/1981 | Lawrence | 364/200 |
| 4,270,170 | 5/1981 | Reddaway | 364/200 |
| 4,380,046 | 4/1983 | Fung | 364/200 |
| 4,412,285 | 10/1983 | Neches et al. | 364/200 |
| 4,514,807 | 4/1985 | Nogi | 364/200 |
| 4,523,273 | 6/1985 | Adams, III et al. | 364/200 |
| 4,569,041 | 2/1986 | Takeuchi et al. | 370/60 |
| 4,598,400 | 7/1986 | Hillis | 370/60 |
| 4,621,339 | 11/1986 | Wagner et al. | 364/900 |

OTHER PUBLICATIONS

Preparata et al. "The Cube-Connected Cycles: A Versatile Network for Parallel Computations" Communications of the ACM, vol. 24, No. 5 (May 1981), pp. 300-309.
Hayes et al. "A Microprocessor-Based Hypercube Supercomputer", 1986 IEEE, pp. 6-17.
Feng T. "A Survey of Interconnection Networks", 1981 IEEE, pp. 5-20.
Pease, M. "The Indirect Binary N-Cube Microprocessor Array" IEEE Transactions on Computers, vol. C-26, No. 5, (May 1977), pp. 456-473.

*Primary Examiner*—Raulfe B. Zache
*Assistant Examiner*—Robert B. Harrell
*Attorney, Agent, or Firm*—Jackson & Jones

[57] ABSTRACT

A network of microprocessors, or nodes, are interconnected in an n-dimensional cube having bidirectional communication links along the edges of the n-dimensional cube. Each node's processor network includes an I/O subprocessor dedicated to controlling communication of message packets along a bidirectional communication link with each end thereof terminating at an I/O controlled transceiver. Transmit data lines are directly connected from a local FIFO through each node's communication link transceiver. Status and control signals from the neighboring nodes are delivered over supervisory lines to inform the local node that the neighbor node's FIFO is empty and the bidirectional link between the two nodes is idle for data communication. A clocking line between neighbors, clocks a message into an empty FIFO at a neighbor's node and vica versa. Either neighbor may acquire control over the bidirectional communication link at any time, and thus each node has circuitry for checking whether or not the communication link is busy or idle, and whether or not the receive FIFO is empty. Likewise, each node can empty its own FIFO and in turn deliver a status signal to a neighboring node indicating that the local FIFO is empty. The system includes features of automatic message rerouting, block message transfer and automatic parity checking and generation.

22 Claims, 13 Drawing Sheets

| NODE | LABEL |
|------|-------|
| A | 000 |
| B | 001 |
| C | 010 |
| D | 011 |
| E | 100 |
| F | 101 |
| G | 110 |
| H | 111 |

NODE SENDS OUT MESSAGE PACKET
TO FIFO $(i,k...l)$ WHERE $i,k...l = 0,1...7$

NODE RECIEVES MESSAGE PACKET
FROM i − FIFO AND SENDS
SAME TO $k,...\ell$ FIFOS

CONCURRENT HYPERCUBE SYSTEM WITH IMPROVED MESSAGE PASSING

BACKGROUND OF THE INVENTION

1. Origin of the Invention

The invention described herein was made in the performance of work under a NASA contract, and is subject to the provisions of Public Law 96-517 (35 USC 202) in which the Contractor has elected to retain title.

2. Field of the Invention

The invention relates to concurrent computing systems wherein identical computers are connected in a hypercube configuration. More particularly, each computer or node processor includes a novel apparatus and method for efficiently controlling message communication tasks within the entire system.

3. Description of the Prior Art

A concurrent processing system with a plurality of concurrently operating computers ("nodes" 1, 2, 4, 8, 16 ..., $2^n$ where n, is any integer) is known in the art. Each node has a processor and the nodes are connected via communication lines in a hypercube configuration.

A new and improved hypercube system is fully described in a copending application entitled "Concurrent Computing System Through Asynchronous Communication Channels," having Ser. No. 754,828, filed on July 12, 1985 and assigned to the California Institute of Technology. In the hypercube or "cosmic" cube system of the above-identified application, packets of data having message headers are moved from node to node through point-to-point bidirectional asynchronous communication channels. Each line of a channel is unidirectional and includes a pair of first-in-first-out (FIFO) buffers. A transmit FIFO and a receive FIFO are located at each end of each line between neighboring nodes. Every cosmic cube node processor brings each received packet into the node, stores the packet, examines a destination-indicator in a message header located in the packet, and either uses the packet or reroutes it in accordance with a common routing algorithm for the overall system.

A description of prior art and certain definitions of relevance to this invention are supplied in the cosmic cube application and will not be repeated herein. For brevity certain information from the cosmic cube application is incorporated by reference herein. Although the cosmic cube system is highly efficient, we have discovered in this invention that the communication speed may be increased while the number of FIFO buffers and associated handshaking is reduced in comparison to that of the cosmic cube system.

SUMMARY OF THE INVENTION

A network of microprocessors, or nodes, are interconnected in an n-dimensional cube having bidirectional communication lines along the edges of the n-dimensional cube. Each node is processor network includes I/O subprocessor dedicated to controlling communication of message packets along a bidirectional communication link with each end thereof terminating at an I/O controlled transceiver. Transmit data lines are directly connected through that node's communication line transceiver. Status and control signals from the neighboring nodes are delivered over supervisory lines to inform the local node that the neighbor node's FIFO is empty and the bidirectional channel between the two is idle for data communication. A clocking line between neighbors, clocks a message into an empty FIFO at a neighbor's node and vice versa.

The communication line between transceivers at adjoining neighbors is bidirectional and is shared by both neighbors. Either neighbor may acquire control over the bidirectional communication line at any time, and thus each node has means for checking whether or not the communication line is busy or idle, and whether or not the receive FIFO is empty. Each neighbor is connected by a plurality of supervisory lines to a neighboring node, and each node sends status or control signals to neighboring nodes, which signals indicate that data communication may take place. Likewise, each node can empty its own FIFO and in turn deliver a status signal to a neighboring node indicating that the local FIFO is empty.

The system of this invention includes the following novel features:

A. automatic rerouting;
B. simultaneous broadcast to all neighboring nodes;
C. block data transfer to and from local FIFO and main memory, and between neighboring nodes; and
D. automatic parity generation and checking of a message packet.

BRIEF DESCRIPTION OF THE DRAWINGS

FIG. 5A is a timing diagram helpful in understanding FIG. 5a;

DESCRIPTION OF THE PREFERRED EMBODIMENT

Concurrent processors, which are connected in a hypercube configuration in accordance with this invention, allow every node a marked degree of flexibility in transmitting message packets. Each packet, as used herein, includes a fixed-length data block that may be sandwiched between a message header and a message trailer. Each node has an I/O processor which is dedicated solely to the task of communication of message packets throughout the entire system. Message packets at any node can be originated locally and broadcast to any or all adjoining neighbor nodes. Message packets, which originate elsewhere, can also be received locally and will automatically be rerouted over an idle channel, as appropriate, according to information in the message header.

Figure 1:
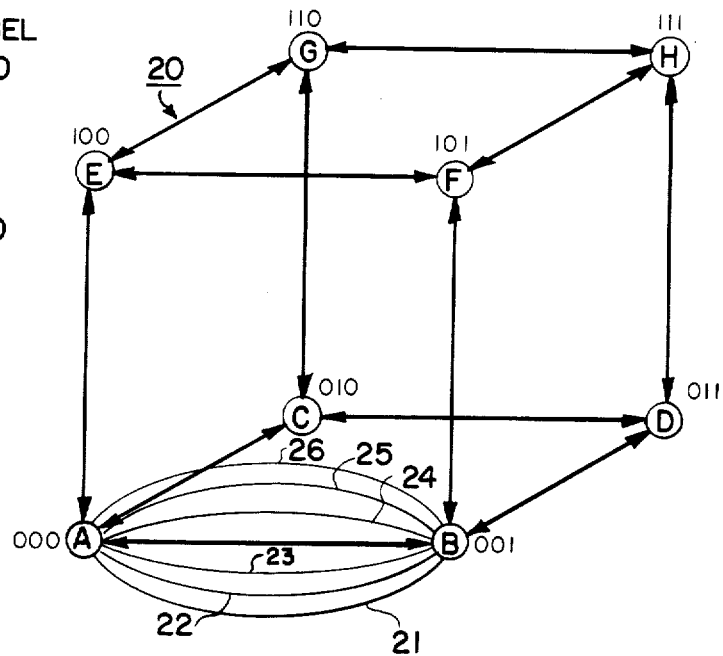
FIG. 1 is a highly simplified view of a cube connected multiprocessor system having data and control lines between processors, which processors are shown simply as circles at the vertices of the cube.

Before explaining in detail the steps involved by hardware and software of this invention in providing flexibility and simplicity of message packet communication, a brief review of the overall system operation as depicted in FIG. 1 is believed in order. FIG. 1 depicts a hypercube configuration of three dimensions, n equal to 3, wherein each processor or node location is shown simply as a circle at the vertices of the cube 20. Bidirectional communication links along the edges only of the cube 20 are shown in heavy lines with double-headed arrows. The arcs 21 through 26, shown in light lines between the nodes identified with binary labels 000 (Node A) and 001 (Node B), designate a plurality of supervisory and control channels. As will be explained in detail, a supervisory channel is one that delivers a signal from a local or neighboring node, which signal will permit the receiving node to determine whether or not message communication between the two nodes can take place. The supervisory channels transmit signals which include the status of a neighbor's FIFO, and whether or not the neighboring node has latched up the data link for a message communication of its own. The supervisory channels, although only shown in FIG. 1, for two nodes, also come to a local node from all of its adjoining neighbors. A neighbor node's condition is reflected by a supervisory signal being interpreted at the local node as a "status" signal. Another supervisory-type signal is the control signal at a node which sets that node's transceiver so that a message communication can take place. Such signals are hereinafter called local control or just "control" signals. For example, when a neighboring node latches up a data link, that action at the local node is a data link busy status signal. The final non-data signal of interest is a clock signal which is sent from a local node to neighboring node(s) in order to load data into the neighboring node(s) receive FIFO(s). Note that each of the eight nodes of FIG. 1 has a unique binary label, or designator, associated with each node as shown in the legend of FIG. 1. Node designations A, B, etc. are associated with a particular order of binary labels as shown by their position in FIG. 1. A three bit group identifies all eight nodes of a three dimensional cube.

TABLE 1

| NODE LETTER DESIGNATOR | BINARY LABEL DESIGNATOR | DIRECTION OF DIMENSION CHANGE |
|---|---|---|
| A | 000 | (M.S.B., Middle Bit, L.S.B.,) |
| B | 001 | (Y Dir. Z Dir X Dir) |
| C | 010 | X Dir: |
| D | 011 | 000<->001 010<->011 |
| E | 100 | 100<->101 110<->111 |
| F | 101 | Y Dir: |
| G | 110 | 000<->100 001<->101 |
| H | 111 | 010<->110 011<->111 |
|  |  | Z Dir: |
|  |  | 000<->101 001<->011 |
|  |  | 100<->110 101<->111 |

The rightmost column of Table 1 explains that a particular placement of the binary labels is employed at the vertices of the cube 20 in order to provide a simple way of determining message movement in the system. As shown in that column, associated with the least significant, or right-most, bit of the binary label, is a movement in the X or horizontal direction. Thus each node that is adjacent in the four horizontally-located-X directions of FIG. 1 differ by a binary "1" only in the L.S.B. position. A binary "1" in that position is indicative of a movement in an X direction. In a similar manner, the designators differ by "1" in the mid-bit location for Z movement into and out of the paper; and by a "1" at the most significant, or left-most bit location indicative of Y movement.

This particular placement and assignment requires only that the destination descriptor or address from the header be modulo-two added to that node's own designator in order to see if it is for the local node or if it is to be moved in an X, Y or Z direction. As an example, if node 001 receives designator 011, the exclusive or output has a "1" only in the mid-bit location, and thus it is to be moved in the Z direction. If address 101 is received at 001, the difference is a "1" in the M.S.B. location or Y direction indicating a required movement in that direction. Examination of FIG. 1 and Table 1 shows that the rule called an EXOR ("exclusive or"), algorithm applies throughout the cube. It also holds true for any k dimensions wherein lowest order (L.S.B.) movement is always first, mid order next and so on up to highest order (M.S.B.). Reference to the cosmic cube application will supply further details of address reading and message passing, if necessary. Suffice it to say for this invention, that only the destination address need be modulo-two decoded, or added to the local address, by any suitable address decoder prior to message movement.

Figure 2:
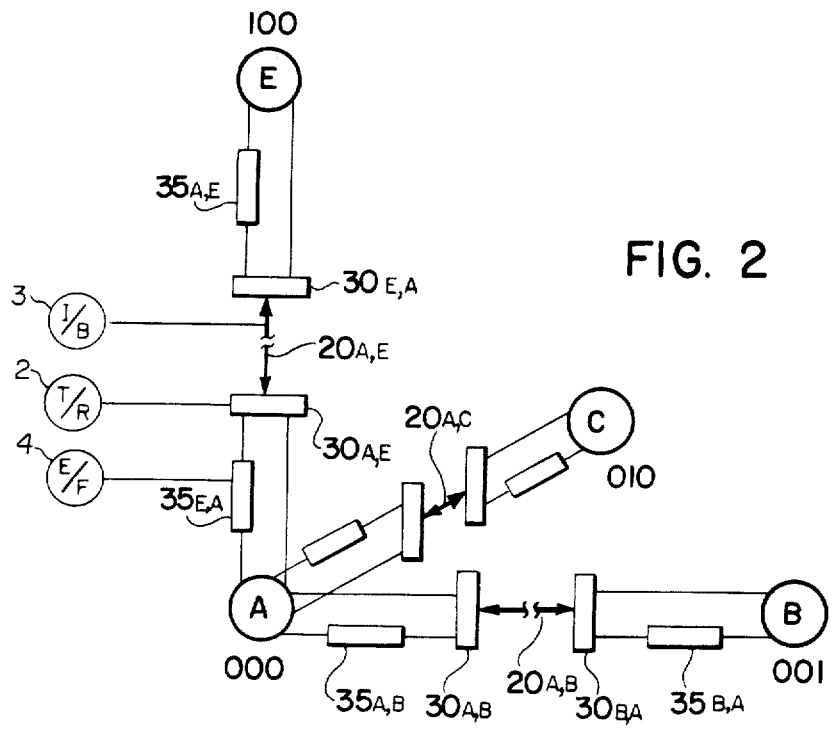
FIG. 2 is a block diagram showing more detail of nodes connected to one vertex of the cube of FIG. 1.

FIG. 2 depicts node A (000) in more detail. As shown by FIG. 2 the three bidirectional data links $20_{A,B}$, $20_{A,C}$ and $20_{A,E}$ are connected in X, Z and Y directions, respectively. Although not shown, a total of six non-data (supervisory, control, clock) channels also connect each node such as node A to node B, A to E, A to C and vice-versa. In this simplified example, node A has only three immediately adjoining neighbors. Each of the bidirectional data links, such as $20_{A,B}$ and $20_{A,E}$ are terminated at the ends by a two-state, three-port transceiver $30_{A,B}$, $30_{B,A}$, $30_{A,E}$, $30_{E,A}$. Such transceivers are normally maintained in a receive condition so that the node location, if appropriate, can receive data from any neighbor at any random and unknown time that a neighbor may arbitrarily select.

Associated with transceiver $30_{A,E}$ is a circle 2 having a "T/R" legend, wherein transmit is a "T" and receive is an "R". Similar status exists for all transceivers. Consider the vertical movement between nodes A and E of FIG. 2. The R state at transceiver 30A,E permits data applied to data link $20_{A,E}$ by node E to move from a bidirectional port into the receive side of node A's FIFO $35_{E,A}$. Subscript E,A indicates that the particular FIFO, from among several at node A's location is assigned to receive data from node E only. When data is moved from node E to node A, the transceiver $30_{E,A}$ at node E is set to a transmit, or T, state by an I/O processor at node E.

Similarly a legend I/B associated circle 3 is shown for the data link $20_{A,E}$ and indicates whether that link is idle ("I") or busy ("B"). Every FIFO also has a legend E/F shown within circle 4 which indicates whether it is empty ("E") or full ("F"). Each of the states shown by the legends may be set or checked by a micro-sequencer controlled by the node's I/O processor.

Figure 3:
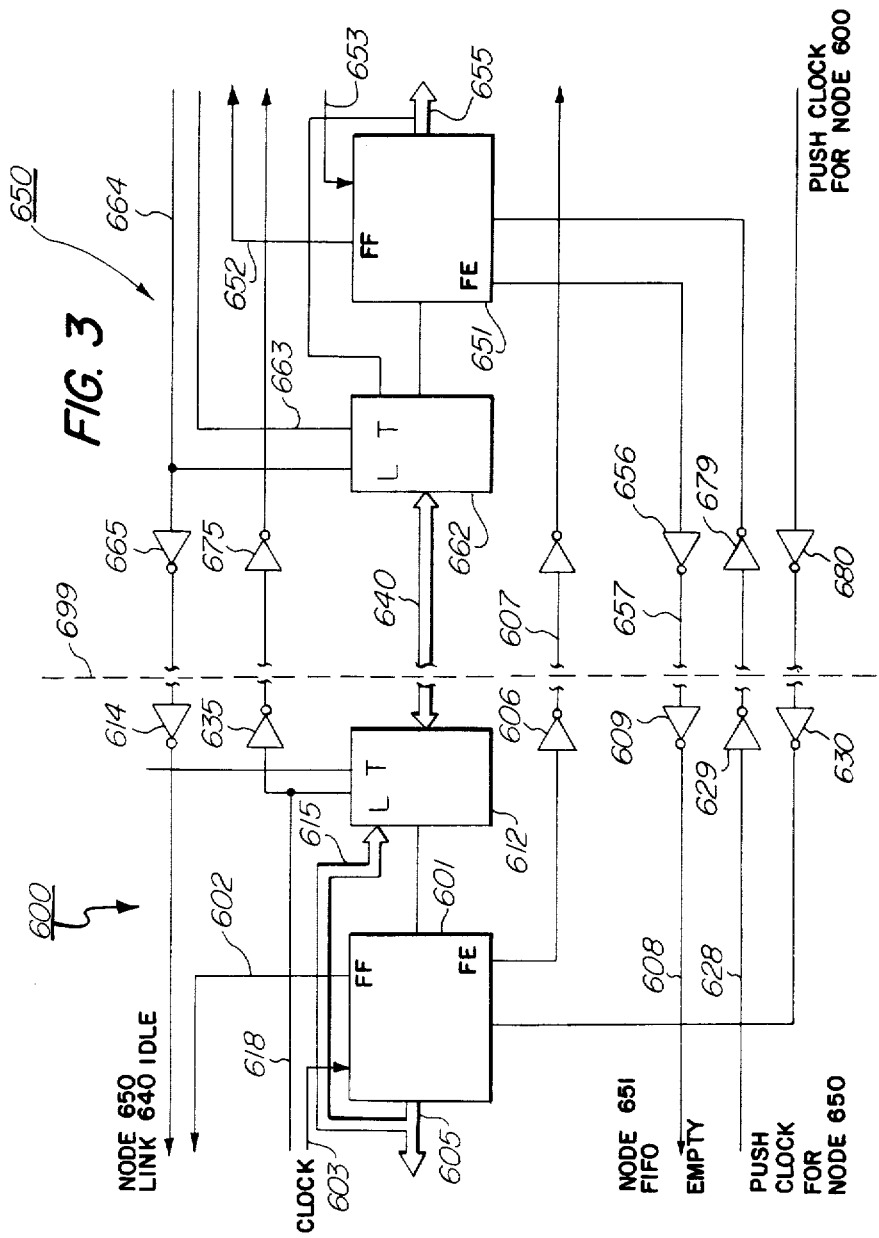
FIG. 3 is a more detailed block diagram of a dedicated I/O processor together with a message communication network and supervisory and control circuits at a pair of nodes.

FIG. 3 is a detailed block diagram showing the interconnections of two neighboring nodes as depicted in FIGS. 1 and 2. The detailed control, supervisory and data link operations will be described for only two nodes with the understanding that it is applicable to all. Dashed line 699 divides the supervisory channels and data links into nodes 600 and 650. Each node to a considerable degree is a mirror image of its neighbor node and thus the description of one applies to both.

FIFO 601, when filled, emits a FIFO full status signal on lead 602. That signal creates an interrupt which causes the local microsequencer to apply several FIFO-unloading clocks on lead 603. These clocks will empty data from FIFO 601 into the communication link 605. A comparable operation for FIFO 650 is achieved by leads 652 and 653 at node 651.

The microsequencers at each node location 600 and 650 control where data on communication links 605 and 655 is stored. When all the data has been removed from FIFO 601, a FIFO empty signal emitted from FIFO 601 is applied through a driver 606 over a supervisory channel 607 to node 650. In a comparable manner, an empty FIFO 651 at node 650 signals that empty status to node 600 by a signal on channel 657 via driver 656.

Before data can be transmitted from any node such as 600 to node 650, for example, the first thing that is checked is the status of the remote FIFO. Assume that a data transmission from node 600 is desired and at that time the FIFO 651 at node 650 is empty. That empty status condition of FIFO 651 is available to the microsequencer at node 600 by virtue of a signal on lead 608 via driver 609.

Since the empty status has been verified the next condition that must be checked is the condition of the data link 640. The condition of data link 640 is dictated by the status of transceiver 662, which status is indicated by a signal condition on lead 644. The transceiver 662 is normally in a receive state. If the channel 640 is seized by node 650, then a channel latch signal is applied to lead 664 and transceiver 662 changes from a receive to a transmit state. A channel latch signal on lead 664, in turn, is delivered to node 600 via drivers 665 and 614. At node 600 a channel latch command is acknowledged as a data channel 640 "busy" signal. Conversely, the absence of a channel latch signal on transceiver 662 is read at node 600 as an indication that data link 640 is not latched and thus is in an "idle" state. When FIFO 651 is empty and data link 640 is idle, the two conditions for a message communication from node 600 to node 650 have been fulfilled. Immediately node 600 latches its own transceiver 612 into a transmit condition by applying a transmit signal level on lead 618. That signal level locks the local transceiver 612 into a transmit mode, and thus completes a data message link from the communication link 605 directly through connected link 615, transceiver 612 and data link 640. The latched condition of transceiver 612 is reflected into node 650 via drivers 635 and 675 as a data link busy signal.

In the meantime, however, for a data message to be transferred it is necessary for transmit clock signals to be sent from node 600 to node 650 to push the data message into FIFO 651. These transmit clocks are applied at lead 628 via drivers 629 and 679. The clock signals from node 600 load FIFO 651 at node 650.

In order to achieve data movement, it should be noted that the channel latch signal on leads 618 or 644, via drivers 635, 675 and 665, 614 respectively, is propagated from one node to the other. Every driver at any given node is chosen with a delay time that is matched to the delay time of signals passing through the node's transceiver. Likewise, all transceivers throughout the system have identical delay times in order to maintain an overall system synchronization. Thus when clock signals, for example, are sent to load/unload a neighbor node's FIFO, the total delay time for that clock signal is matched to the total delay time for data moving through the transceivers at both nodes.

Figure 4:
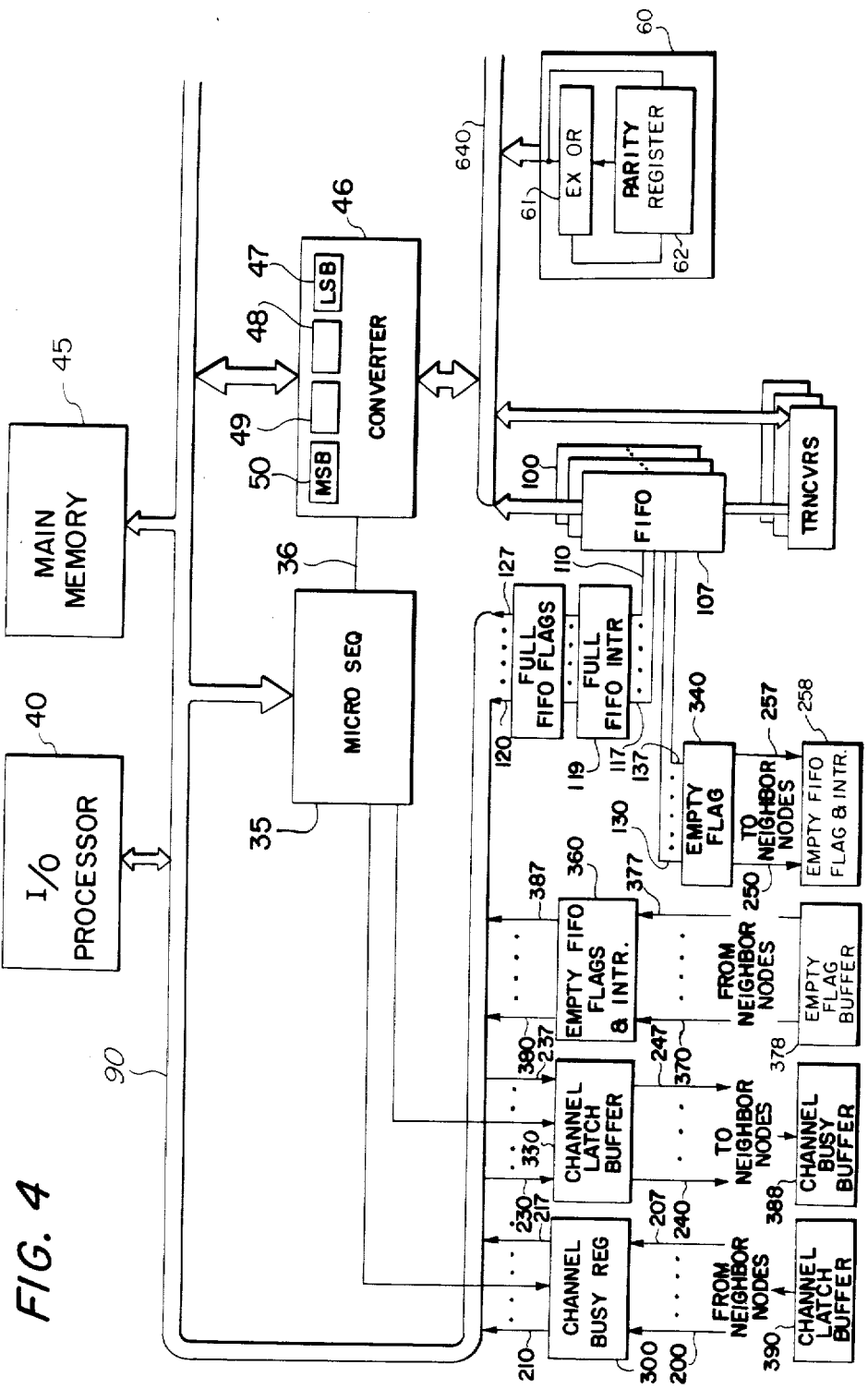
FIG. 4 supplies more detail on how tranceivers and FIFO's at both ends of a channel link are controlled by a local I/O processor.

FIG. 4 depicts an I/O processor with the communication network and the microsequencer 35. Microsequencer 35 is the main controller of all of the circuitry shown in FIG. 3. Not all of the connections to various registers which are controlled and sensed by microsequencer 35 are shown. The manner of sensing and control will become clear in connection with a description of the various registers of FIG. 4 and the flow charts to be described subsequently.

An I/O processor 40, which in a preferred embodiment is a MC68020, initializes microsequencer 35 by invoking the correct addresses to microsequencer 35. Once initialized, microsequencer 35 is sequenced through a series of states, with each state invoking a set of commands to the various control points of the circuits in FIG. 4. A more detailed explanation of microsequencer 35 and these control states is provided later in connection with a description of FIG. 5 and 5A.

A total of eight FIFO units 100 through 107 are provided in a preferred embodiment. Each FIFO is capable of storing sixty-four eight bit bytes. When completely filled, the FIFO emits a FIFO full signal on leads 110 through 117. Associated with FIFO's 100 through 107 is a full FIFO interrupt mask register 119. The mask register 119, in a manner well known in the art, responds to a full FIFO signal on any or all of input leads 110 through 117 by setting an appropriate flag signal bit on one of the eight output leads 120 through 127. A full FIFO interrupt is also delivered to the I/O processor 40 and to the microsequencer 35. Since an interrupt procedure is employed, a full FIFO interrupt requires a determination of the particular identity of the FIFO that is full. I/O processor 40, in response to the interrupt, decodes that identity by decoding the output leads 120 through 127, each of which is uniquely associated with one each of FIFO's 100 through 107, to determine which one is true.

A full FIFO interrupt is indicative of a local node operation. This is in contrast to an empty FIFO interrupt, which is associated with an operation involving a non-local node. In response to a full FIFO interrupt, all of the data in the interrupting FIFO can now be unloaded onto the local eight-bit or line bus 90. Communication bus 90 first delivers the header to I/O processor 40. Processor 40 reads the identity of the designator or address and applies the rules of the routing algorithm discussed earlier. If the data in the full FIFO is properly destined for the local node, e.g. the modulo-two sum of the local address and header address is a binary zero, then the FIFO is unloaded into a main or other memory 45 at the local node. Note that no requirement for latching the bidirectional communication link 640 is mandatory when the destination shows that the packet is for the local node. This is in contrast to the situation wherein the destination address is non-local. In that event, an idle bidirectional data channel is required.

A channel busy register 300 and a channel latch buffer register 330 each having eight input leads 200 through 207, and 230 through 237 are available for a non-local transfer of a message. Associated with each one of the registers 300 and 330 are eight output leads 210 through 217 and 240 through 247, respectively. As shown in FIG. 4 the input leads 200 through 207 and the output leads 240 through 247 of registers 300 and 330 respectively come from and go to neighboring nodes. Only one neighbor node channel to and from a neighbor's channel busy buffer register 388 and a channel latch buffer 390 are shown but it is to be understood that the other seven leads go to and come from other neighboring nodes not shown. Similarly, an empty FIFO buffer register 340 has output leads 250 through 257 which go to neighboring nodes an empty flags and interrupt buffer 258. When all of the data is clocked out of any of the eight FIFO's 100 through 107 an appropriate one of leads 130 through 137, indicative of that empty FIFO status receives the empty FIFO signal. In response, an empty FIFO flag bit is set in register 340.

Conversely, an empty FIFO flag and interrupt register 360 is connected to all the neighboring nodes by input leads 370 through 377. Any or all neighboring FIFO's may supply FIFO empty signals to register 360, and such signals set corresponding empty FIFO flags at register 360. Output leads 380 through 387 from register 360 are employed to deliver empty FIFO interrupt signals to the I/O processor 40. In defining this invention, an empty FIFO implies that a neighboring node's FIFO, as contrasted to a local FIFO, is involved in the operation. All local operations are set up with a four half-word, or thirty-two bit wide format. Accordingly, each four half-words require an 8 to 32 conversion by converter circuit 46, FIG. 4. Converter 46 receives eight-bit wide bytes and converts four of such bytes into a thirty-two bit word or vice-versa. Each conversion involves a most significant byte ("M.S.B."), a second most significant byte ("2nd- M.S.B."), a second-least significant byte ("2nd- L.L.B."), and a least significant byte. Digital transceivers are employed in the conversion. In order to avoid any confusion these conversion transceivers are defined as word-to-byte transceivers to distinguish them from the FIFO, or data, transceivers which interface the FIFO's with the bidirectional data communication lines along the edges of the cube.

Figure 5:
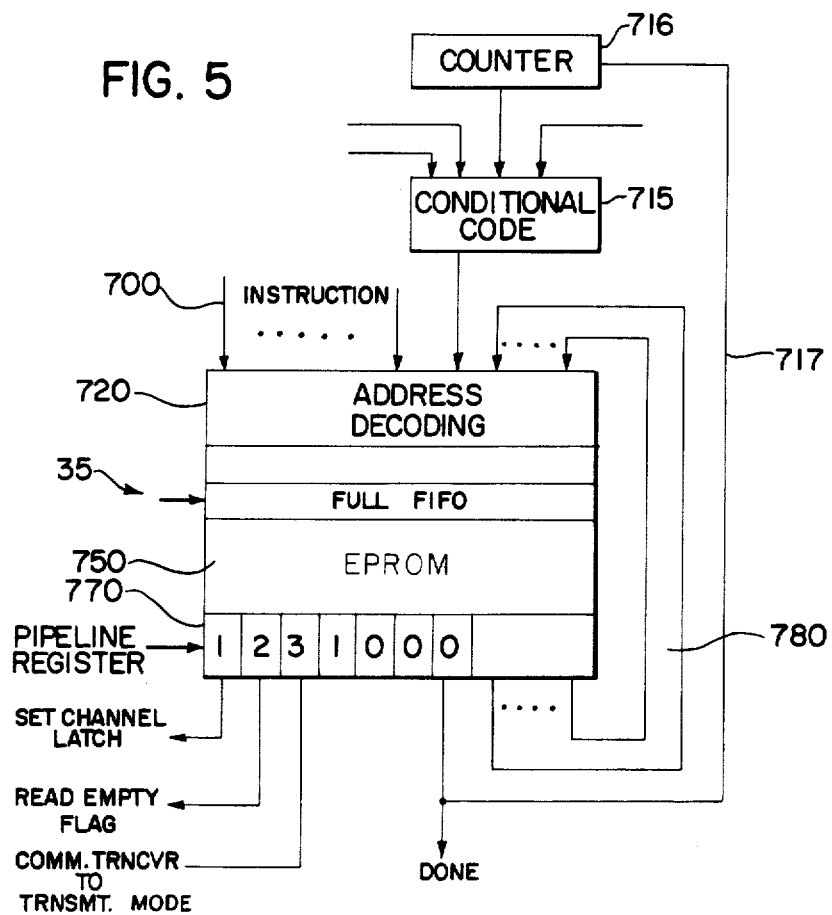
FIG. 5 is a block diagram showing a more detailed diagram of the microsequencer-controller of FIG. 4.

Byte converters 47, 48, 49 and 50 are shown within converter 46, FIG. 4. Microsequencer 35 via lead 36 controls the states of transceivers 47 through 50 in order to transmit or receive words and/or bytes depending upon the direction of movement of data. For clarification purposes, assume that one of the FIFOs 100 through 107 is to be read and that a header is at the top of the FIFO that is full and must be read. Under this assumption eight-bit wide half words will be popped up sequentially from a FIFO. The first half word is the M.S.B. the next half-word is the 2nd M.S.B., etc. FIG. 5 depicts, a more detailed view of the microsequencer 35 of FIG. 4. In FIG. 5, a plurality of input leads 700, etc., are connected to an address decoding section 720 of an erasable programmable read only memory ("EPROM") 750. The motorola MC68020 control processor, in our preferred embodiment, invokes a proper address by supplying an address signal as a seven-bit word to address lead 700. That address is decoded by decoder 720, and a proper jump is made to an addressed location within EPROM 750. A routine within the EPROM 750 is selected and is executed while a given address is held at input lead 700. Once addressed, a sequence of instructions called microcoding is outputted in a pipeline register 770. Each binary position in register 770 is connected to a particular control point in the circuit of FIG. 4. Before supplying a representative example of how such circuits are controlled, a characteristic of a pipeline register is noted with reference to FIG. 5A.

Figure 5A:
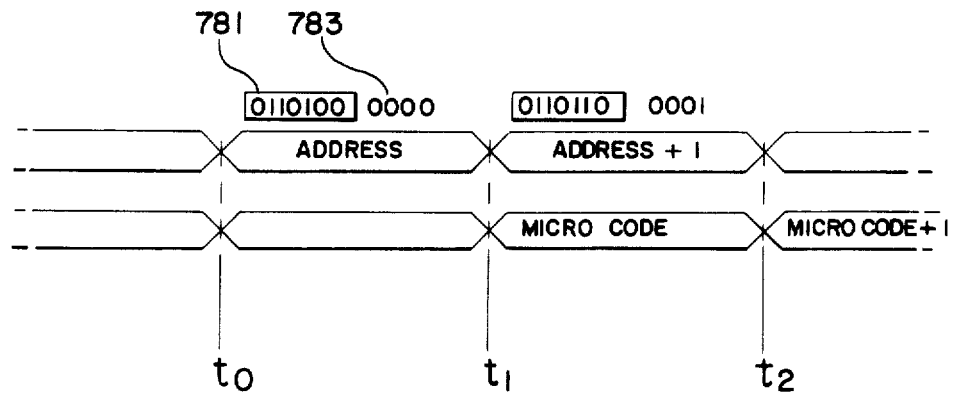

As shown between time $t_0$ and $t_1$, FIG. 5A, a complete address involves a higher order address 781, such as 0110100, and a lower order address 783, such as 0000. The lower order address is automatically sequenced during the time that a higher order address is held so that a required number of microcode steps can be accomplished. Each microcode includes address bits that change until a required number of steps for a given higher order address, or instruction, has taken place. For example, note in FIG. 5, that the last four bits of pipe line register 770 are fed back by leads 780 as a new lower order address to the input of address decoder 720. Bit identity within the lower address portion thus controls the other bits in the pipeline register 770, and also controls each new microcode addressing sequence. As shown, for example, in FIG. 5a an execution of a command by sequencer 35 and the accessing of a next step within that command is done simultaneously by the address feedback leads 780.

Figure 6:
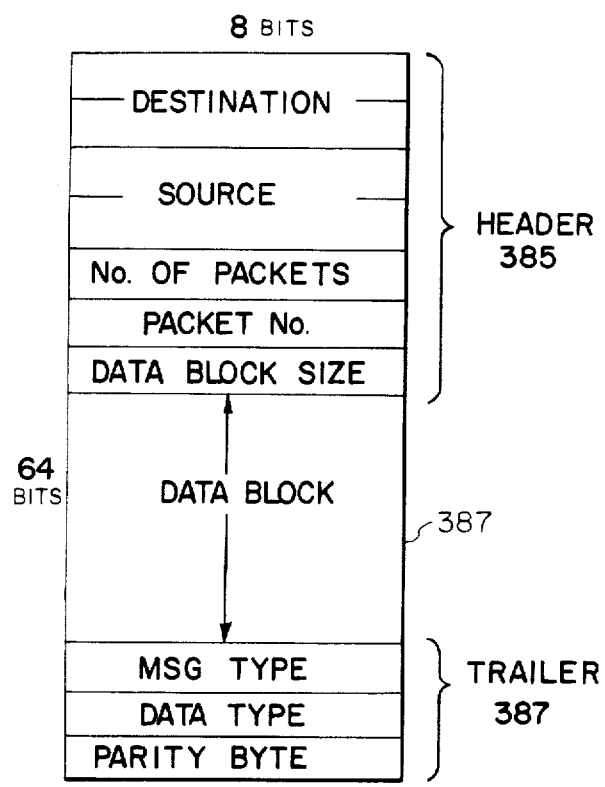
FIG. 6. depicts a block of data.

A horizontal programming system is employed wherein each bit in the control portion of the pipeline register 770 goes directly to a control point in FIG. 4 without any decoding. For example, when a 27S45A bipolar EPROM chip having 2K×40 bits is employed, in our preferred embodiment, the first several high order bits are used for control. The most significant pipe line bit may, for example, control the channel latch. A binary "1" in that position sets the channel latch to a latched or transmit position. The next most significant bit is used, for example, to read a FIFO empty flag. The next bit location sets the local transceiver to a transmit mode etc. The manner of such control is well known to those of ordinary skill in this art and needs no further description. FIG. 6 shows how a message packet would typically be configured for an 8-bit by 64 word message used in our preferred embodiment. Quite obviously other message packet sizes are within the scope of our invention. The first several bytes (eight bits each) define a message header 385. Typically, the header format defines the destination address for the message packet by the first two bytes. The next two bytes define the source. The next bytes define the number of packets which make up an entire message, the packet number etc. The parts of header 385 are clearly labelled, in FIG. 6 and are self explanatory. If more detail is needed, one should check the cosmic cube application for applicable additional definitions and description.

Data block 387 itself may not totally fill up all space allotted for data. As noted earlier, full FIFO interrupts are necessary for the system operation. An incompletely filled FIFO would not create a full FIFO interrupt even though all the actual data had been inserted following the header 385. Accordingly, the I/O processor 40, FIG. 4 always fills the entire data block space 386 with "1's" or "0's" in the space left over after a short message has been loaded.

Trailer 387 involves several bytes as labeled in FIG. 6. Again, most are self explanatory, and the cosmic cube definitions and descriptions may be reviewed if more detail is desired. Briefly, however, a message type would be whether an acknowledge is expected. Thus, if an error is detected, an acknowledge would supply the command to retransmit. Data type explain the character of data block 386. For example, data block 386 may represent an integer number, a real number, a floating point number, a character, etc. The parity is the final byte of every message packet. Its function and how it is generated will be explained in greater detail later.

A parity unit 60, FIG. 4, monitors the data that appears on communication bus 640. Parity unit 60 includes an Exclusive OR ("EXOR") parity check circuit 61 and a parity register 62. Parity unit 60 both checks and generates the parity for a stream of data.

Before loading or unloading a FIFO, the parity unit 60 must be cleared first and then enabled. As the FIFO unloads data on the communication bus 640, the parity unit 60 via logic 61 checks the data and stores the results back to the parity register 62. Since register 62 is initially set to a zero condition, the register contains the even parity of the data stream. As well known, even parity counts the number of binary ones, including the one that must be added in the parity byte. That number must be even. The parity of the data packet is thus calculated, including the last byte of the packet which byte is its parity. Note the last byte of trailer 387, FIG. 6.

The two parities are compared by performing an EX OR logic operation in logic circuit 61. A nonzero of any of the 8-bit bytes indicates a parity error. Although only a single bit error per byte position is detectable by parity unit 60, this is sufficient in our invention as our communication lines are short and the probability of double error on the same line is very remote. I/O processor 40 reads the parity register 62 at the end of a message packet transfer to check the validity of the data. In our invention a dual function is performed by the parity unit 60. When loading the FIFO, the I/O processor 40 loads the first 63 bytes of the packet, and the parity unit 60 automatically loads the last parity byte.

Figure 7:
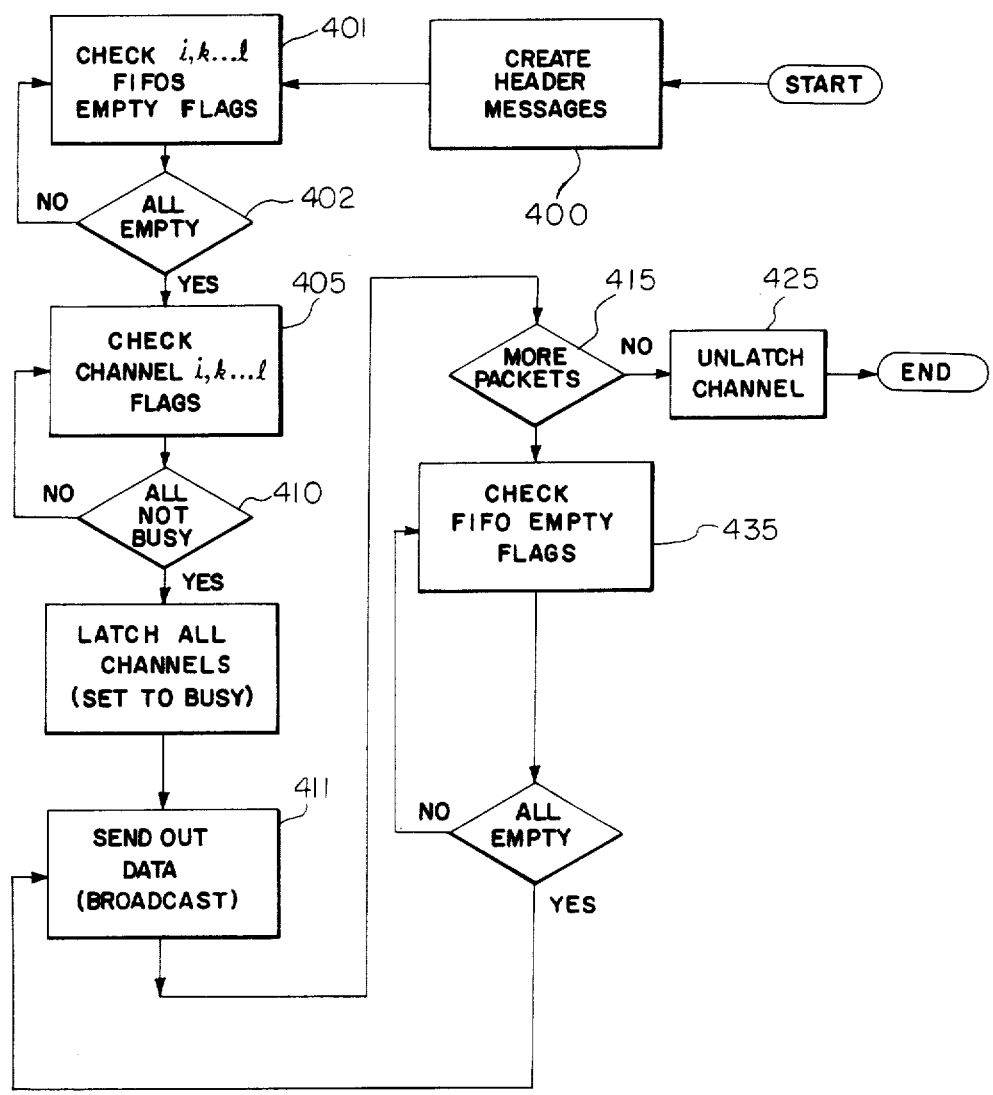
FIG. 7 is a flow chart depicting a generalized case of a message being communicated between neighboring nodes.

Turning now to FIG. 7 and the block diagram of FIG. 4, the operation involved when a node sends a message to a receive FIFO will be described. As shown in FIG. 7, action block 400 creates a header of the type discussed above. The creation of the header involves the destination address. The next step, as shown by action block 401, is to determine whether the particular FIFO at the node to which the message is to be routed is empty. A check of the empty FIFO flags is thus made and the status of the appropriate one of nodes i, k . . . l, is determined. Note in FIG. 4 that all neighboring nodes supply the empty status to register 360 via input leads 370 through 377, e.g. one of the nodes identified as 0,1 . . . 7 in the three-dimensional cube example given earlier, would set an empty FIFO flag. In FIG. 4, I/O processor 40 would check the output leads 380 through 387 of register 360 to make the status determination.

Assume at this point that a broadcast is the instruction to be implemented. Decision block 402 must determine whether all FIFO's are empty. If they are not, the operation repeats by following the "no" loop until all FIFO's are empty, at which time action block 405 checks to determine if all the channels (i, k . . . l) are idle. That idle/busy information is present in register 300 and I/O processor 40 can, via microsequencer 35, latch the selected channel by a signal on register 330. Each channel is thus set to busy in anticipation of a broadcast. A transceiver of each idle channel receives a channel latch command which locks the transceivers at each end of the idle channel into a busy or transmit mode. A message to be broadcast, as shown by action block 411, is then sent out over the latched channels into the empty FIFO's at all neighboring nodes. Since several messages may often be required to make up a complete broadcast, decision block 415 determines whether or not more than one message packet is involved in the broadcast. If only one packet is involved, action block 425 unlatches all channels and the routine is at an end.

On the other hand, if more packets are to be transmitted, it is essential to await a FIFO empty status until the next packet can be transmitted. If all FIFO's are not empty, decision block 435 repeats its check until all FIFO's are empty and the next message packet is sent out. When there are no more packets and the answer at decision circuit 415 is finally no, then action block 425 unlocks all channels and the routine is at an end.

It should be understood that a broadcast need not go to every node, but may go only to certain addressed neighbors, such as a particular three neighbors from a total of eight. Also, it is to be understood that only one node may be addressed, and that only one channel needs to be latched. Modifications, as necessary, in the generalized flow diagram will readily become apparent to those of ordinary skill in this art.

Figure 8A:
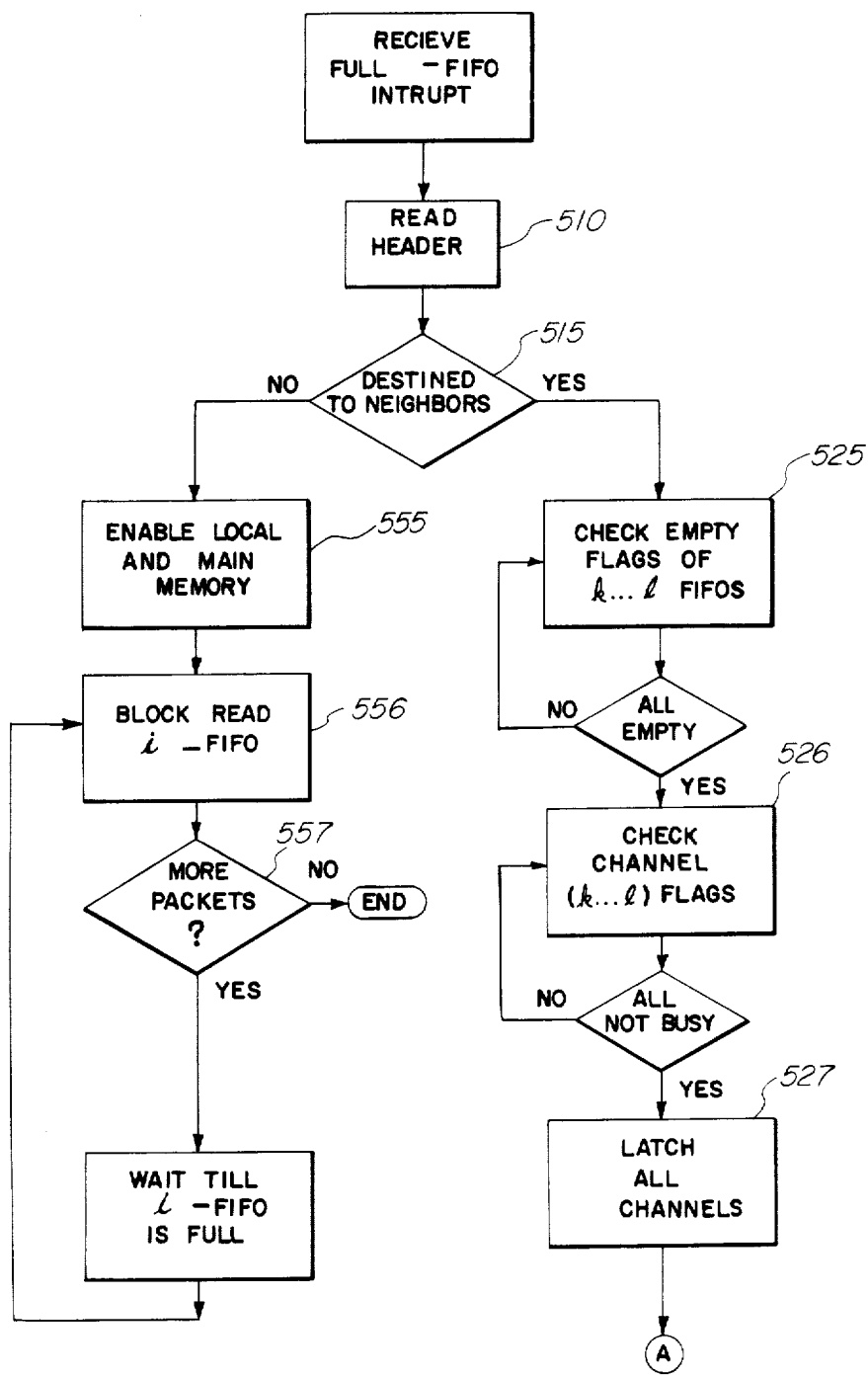
FIGS. 8a, 8b and 8c together constitute a flowchart depicting, in three parts - 8a, 8b, 8c, a generalized case of a node responding to its own FIFO full interrupt and sending out a message packet to any or all of its neighbor nodes.
Figure 8B:
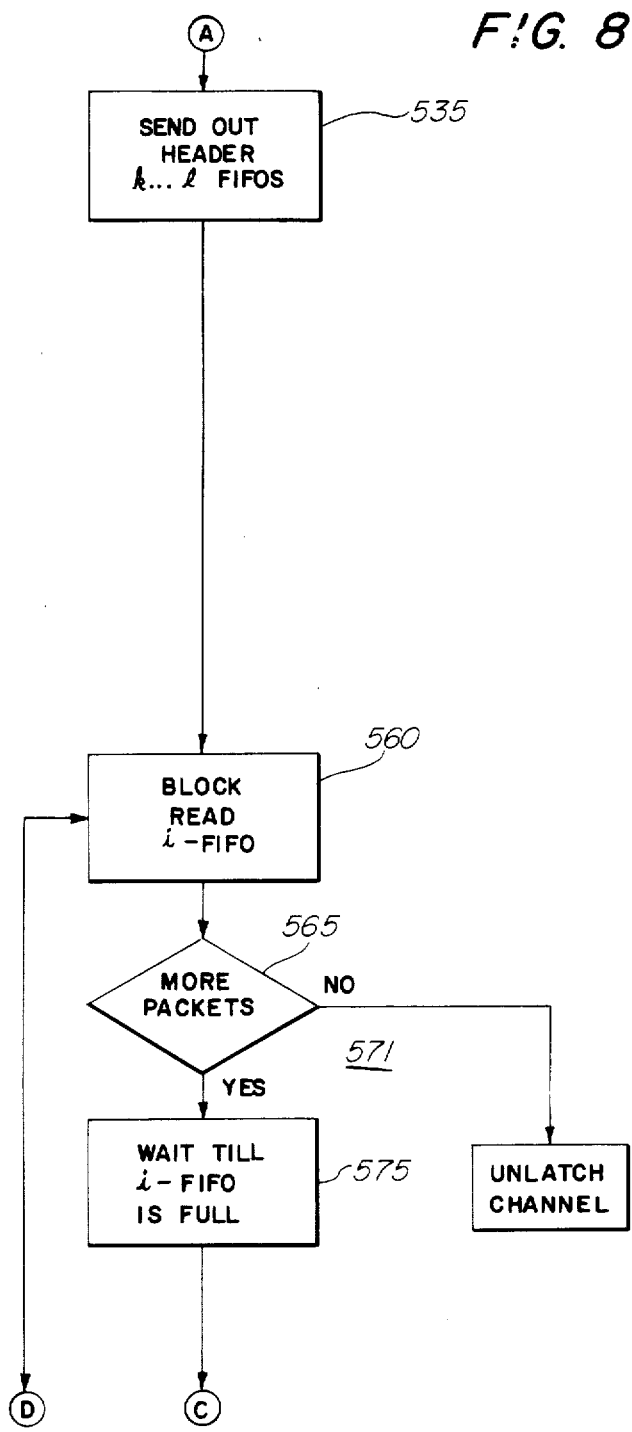
Figure 8C:
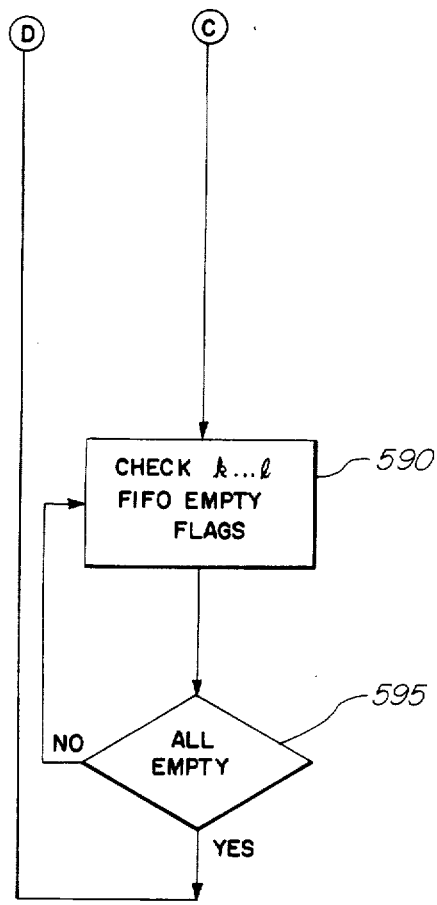

FIGS. 8a, 8b, and 8c together depict a flow chart showing how a node will receive a message packet, and send it out to k . . . l nodes, where k . . . l is equal to 1 through 7 in the given example. The sequence of FIG. 8a starts with a receive full FIFO interrupt, which is delivered to the I/O processor 40 of FIG. 4 as described earlier. At that point, as shown by action block 510, the header of the message in the i-FIFO is read, and, by a modulo-two addition, a determination by decision block 515 will be made as to whether it is a local message, or whether it is destined for a neighboring node. If the message, according to decision block 515 is for a local node, and is to be stored, for example, in the local node's main memory. Then all that is required is to enable the local node's main memory. Action block 555 is satisfied when all packets are read and sent to the local and main memory. A message packet is read by action block 556, and decision circuit 557 checks to see whether more packets remain to be transfered. If not and that one message was for local and main memory only, then decision circuit 557 ends the procedure. If more packets are to be read, each reading operation requires that the i-FIFO is full.

If the message is for neighboring nodes, the empty flag at the appropriate one(s) of the seven neighbors is checked by decision block 525, and, when all are empty, then the channel to those nodes, by action block 526, is checked to determine when the channels are idle. When all appropriate channels are not busy the channels are latched by action block 527. As shown in FIG. 8b action block 535, thereafter, sends out a header to the appropriate one(s) of the k . . . 1 FIFOS.

A block read, action block 560, then takes place. The action in block 590 (FIG. 86) is taken to check the FIFO empty flags. When all FIFO's are empty, decision block 595 will answer yes and a block read at block 560 has occured. The operation continues as long as more packets are to be transmitted. When no more packets are indicated by the answer from decision circuit 565, the routine is over and the channel is unlatched.

Figure 9A:
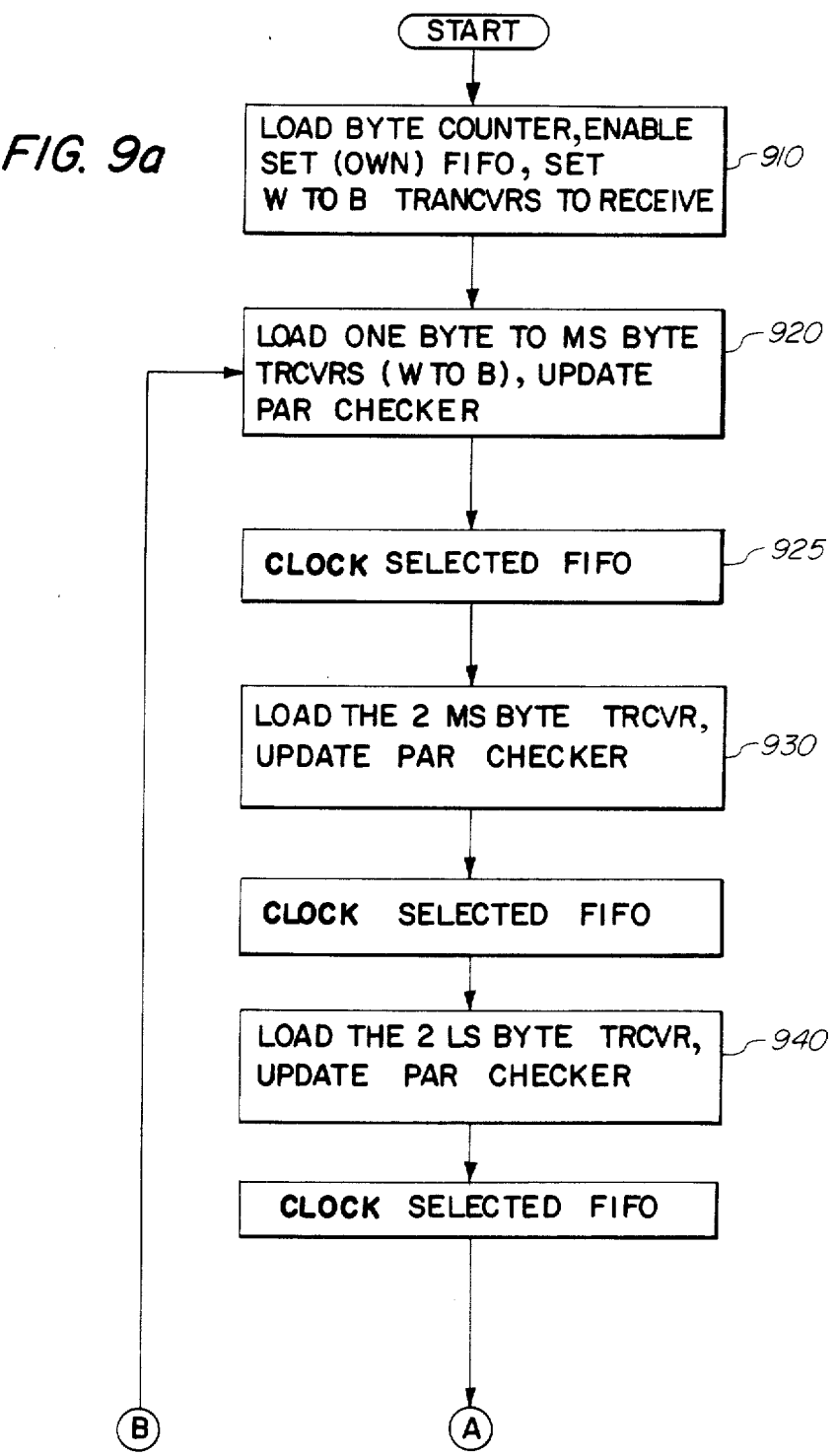
FIGS. 9a and 9b together constitute a flowchart, in two parts - 9a, 9b depicting a block read from a FIFO.
Figure 9B:
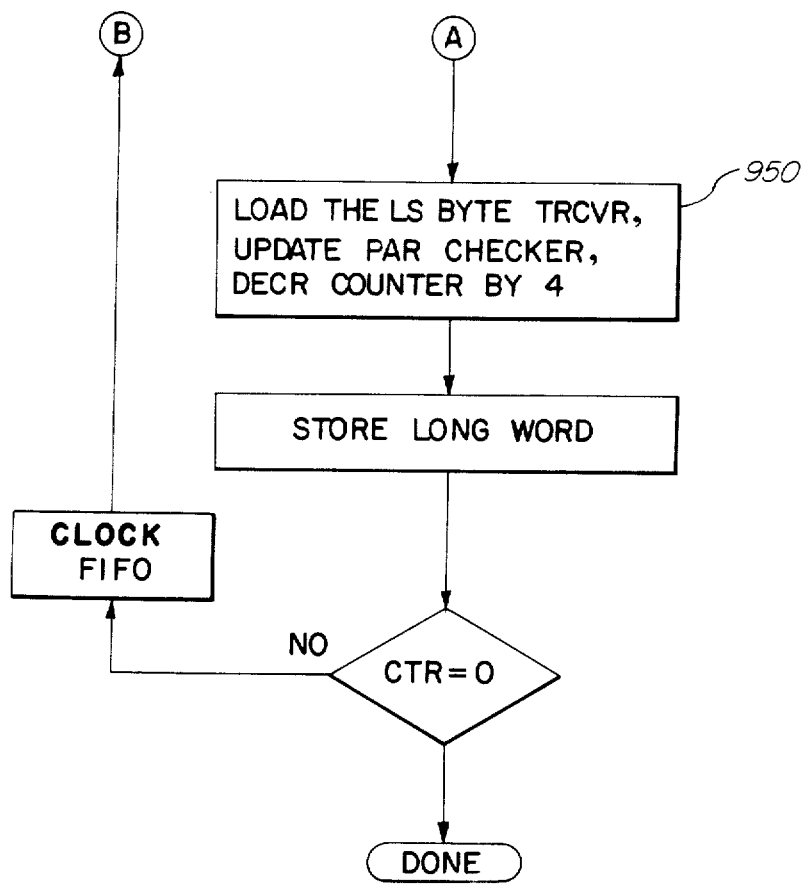

FIGS. 9a, 9b, 9c together constitute a flow chart depicting a FIFO write operation. Again it is initially assumed that the software tasks have been accomplished so that A. A FIFO empty flag at a destination node has been verified.

B. The data link to the destination node is idle.

C. A "FIFO WRITE" instruction has been issued; and

D. Parity has been cleared.

Thereafter, as shown in action block 910, FIG. 9a, thirty-two bits that must be written into a remote FIFO are on the local bus 90. The four bytes, M.S.B., 2nd M.S.B., 2nd L.S.B. and L.S.B., are handled in the manner shown by action blocks 920, 930, 940 and 950 of FIGS. 9a and 9b.

After loading the M.S.B. byte, the selectd FIFO must be advanced. That advance is done by a clock signal which pops up the selected FIFO. Next, the 2nd M.S.B. byte, as shown by action block 925 in FIG. 9a is loaded, and microsequencer 35 causes the second most significant byte to be loaded through W-to-B transceiver 49 (FIG. 4). Parity check is again updated as shown by action block 930. It takes four eight-bit bytes to constitute one thirty-two bit word and thus the operation is repeated until the least significant byte has been loaded as shown by action blocks 940 and 950. When action block 950 has completed updating of the parity check, as shown at the end of the flow chart of FIG. 9b, a bit is supplied from microsequencer 35 to tell the processor 40 that a new address can be issued and more unloading can take place.

Although not shown by a separate flow chart, a "FILL FIFO" is very similar to a write FIFO operation with, the additional fact that the operation described in FIGS. 9a and 9b is repeated several times. Counter 716, FIG. 5, is set to the required number of FIFO write operations. As each individual write operation is finished a feedback operation, via lead 717, decrements the counter 716. When the counter reaches zero the FILL FIFO operation will be concluded after that last FIFO write step is finished.

Figure 10A:
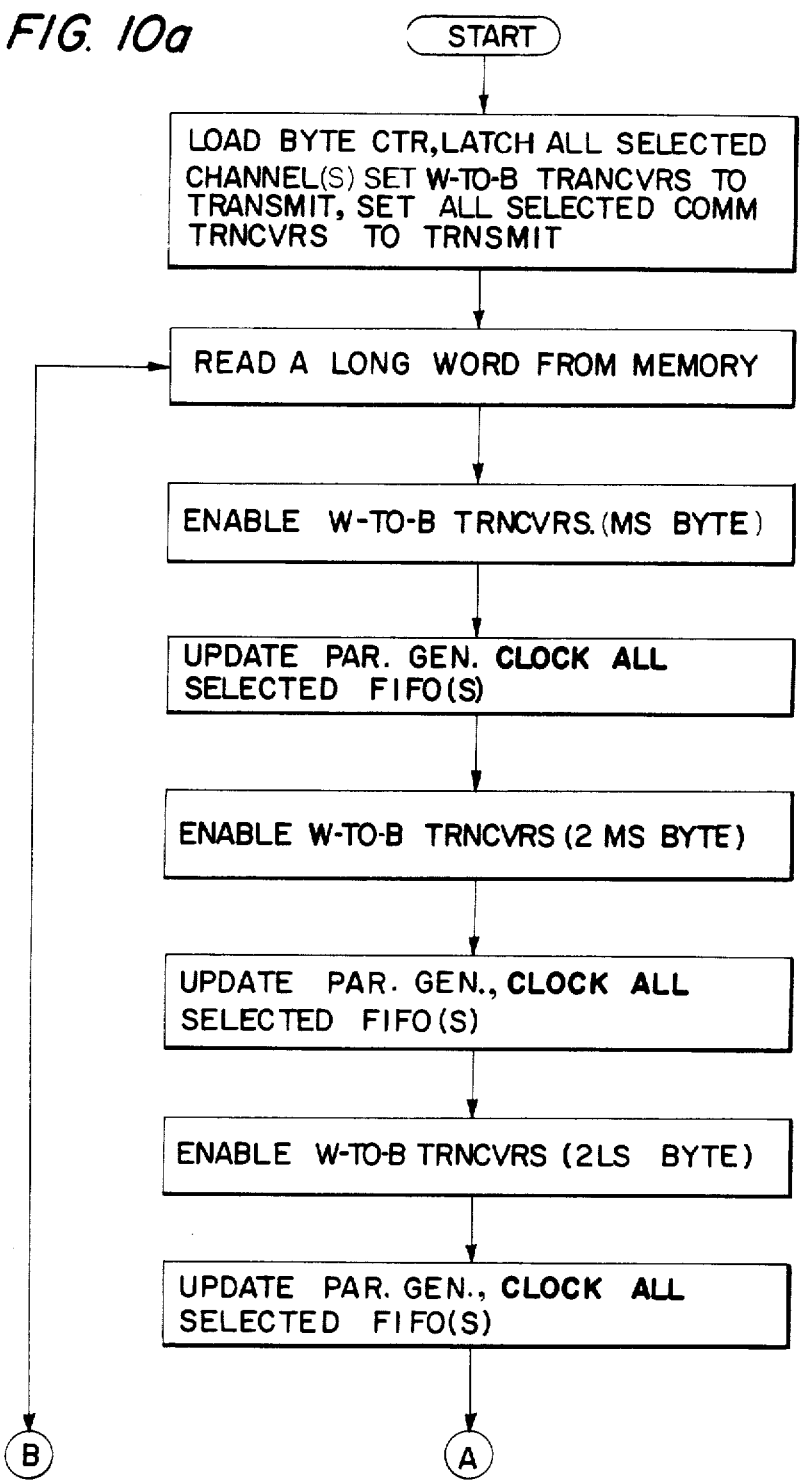
FIGS. 10a and 10b together constitute a flowchart, in two parts - 10a, 10b, depicting a block write into a FIFO.
Figure 10B:
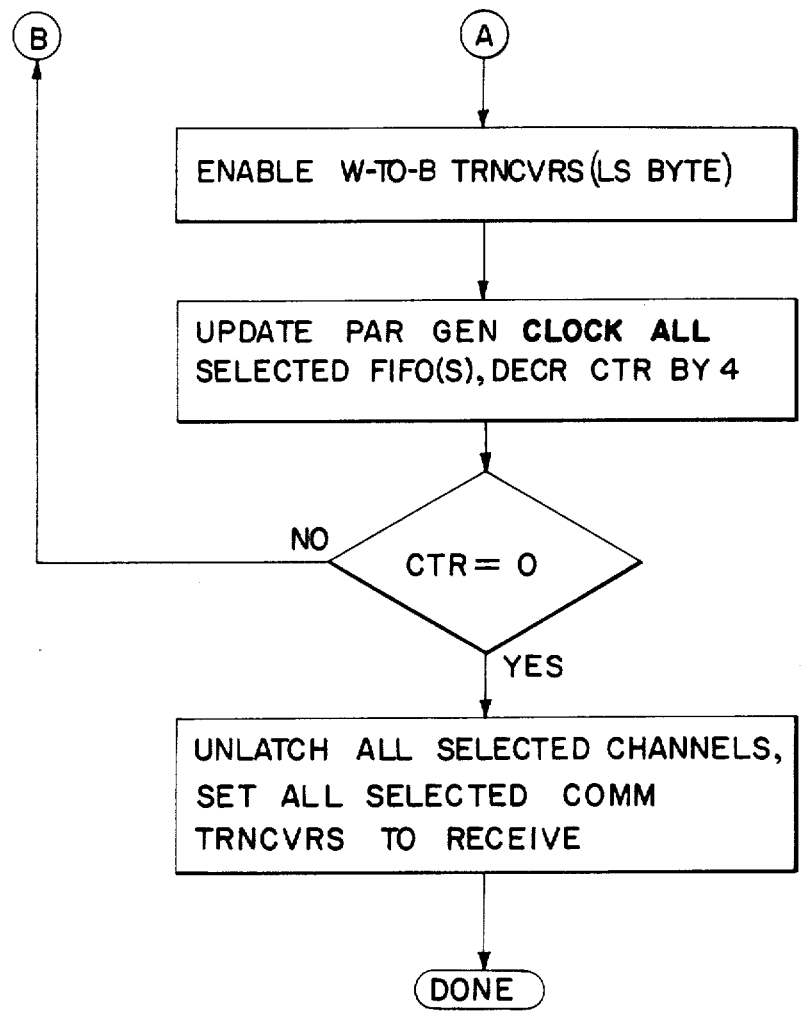

The remaining flow chart of FIGS. 10a and 10b is self explanatory, in light of the previous description, and only some of the differences will be noted. FIGS. 10a and 10b depict a FIFO reroute, wherein the number of bytes to be counted is loaded into counter 716, FIG. 5, and once those channels are latched the data is rerouted until counter 716 is decremented to zero.

A block read is not depicted. It is believed to be self explanatory in that a byte counter is again set and is then decremented. The transfer is a local operation, and thus it is not necessary to latch any data communication links. Transfer of the bytes is otherwise the same as that described for FIGS. 9a, 9b and 9c.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. An asynchronous system of multiprocessor computers ("nodes") connected in a hypercube network configured as a cube, which cube includes nodes at each corner of the cube, bidirectional communication lines for passing data messages along the edge of the cube, and any node in said network being designable as a local node which has its nearest nodes in said network designated as immediate neighboring nodes, said system comprising:

a dedicated I/O processor at every node assigned only for communication tasks throughout said cube-configured network, with each I/O processor operating independently of every other I/O processor in the network to control its own node's data message passing to its own immediate neighboring nodes;

a local FIFO at each node connected to a bidirectional communication link which is connected between a local node and each immediate neighboring node;

A FIFO-loading control line leading from a local node to each immediate neighboring node in said cube-configured network; and means associated with a local node's I/O processor and under control of said local I/O processor for loading the neighboring node's FIFO via signaling over said bidirectional communication lines and said control line.

2. A system in accordance with claim 1 wherein data messages to be routed through the FIFO's of said hypercube-configured network are each preceeded by a destination address, and further comprising:

means at each node associated with the dedicated I/O at that node for reading the destination address from each data message in each node's own FIFO; and means responsive to said destination address read by said reading means for either unloading the local FIFO at the local node or for transferring the data message in the local node's FIFO to an empty receive FIFO at one of said immediate neighboring nodes as indicated by said destination address.

3. A system in accordance with claim 1 and further comprising:

transceivers at each node connected between each node's FIFO and the bidirectional communication lines connected to said FIFO at each node, with each transceiver being set to a receive or a transmit state;

means at each node associated with the dedicated I/O at that node for controlling the state of that node's transceivers and the state of the transceivers at said immediate neighboring nodes, said transceivers, when in a receive state, directly apply data from said bidirectional communication lines to said local node; and means associated with each of said transceivers, when said transceivers are in a transmit state, for directly applying data from said local FIFO to said bidirectional communication lines.

4. A system in accordance with claim 3 and further comprising:

means for storing at a local node a signal indicative of a full or empty status of each local FIFO.

5. A system in accordance with claim 4 and further comprising:

means at a local node for applying to an immediate neighboring node, a FIFO empty signal indicating that a local FIFO assigned to that neighboring node is empty.

6. A system in accordance with claim 3 and further comprising:

means at a local node responsive to the transmit state at any one of said transceivers for storing said state as a channel busy indication to an immediate neighboring node that the status of the bidirectional communication lines between the local node and said neighbor node is busy.

7. A system in accordance with claim 6 and further comprising:

a microsequencer associated with a dedicated local I/O processor and responsive to an absence of a channel busy signal from a transceiver at said destination address for immediately latching said transceiver to a transmit state when a data message is to be sent over the bidirectional communication lines connected to said transceiver.

8. A system in accordance with claim 7 and further comprising:

means at a local node for storing said channel latch signals associated with each transceiver; and means at a local node for supplying said channel latch signals from said local node to an immediate neighboring node which is connected to said transceiver.

9. A system in accordance with claim 8 and further comprising:

means at a local node for receiving, from all immediate neighboring nodes, signals indicative of an empty FIFO at said immediate neighboring node(s); and control means supplying a FIFO-loading clock to said empty FIFO at said immediate neighboring node(s) for loading data supplied from a local node into said FIFO at said immediate neighboring node.

10. A system in accordance with claim 5 wherein:

a dedicated I/O processor at said immediate neighboring node responds to said FIFO empty signal received from said local node for loading the empty FIFO at said local node under control of said dedicated I/O processor at said neighboring node.

11. An asynchronous system of multi-processor computers ("nodes") connected in a hypercube network configured as a cube, which cube includes nodes at each corner of the cubes, bidirectional communication lines for passing data messages along the edges of the cube, and any node in said network being designable as a local node which has its nearest nodes in said network designated as immediate neighboring nodes, said system comprising:

a dedicated I/O processor at every node assigned only for communication tasks throughout said cube configured network, with each I/O processor operating independently of every other I/O processor in the network to control its own node's data message passing to its own immediate neighboring nodes;

a local storage means at each node connected to a bidirectional communication link which is connected between a local node and each immediate neighboring node;

a control line leading from a local node to each immediate neighboring node in said cube-configured network; and means associated with a local node's I/O processor and under control of said local I/O processor for loading the neighboring node's storage means via said bidirectional communication link and said control line.

12. An asynchronous system of multi-processor computers ("nodes") connected in a hypercube network configured as a cube, which cube includes nodes at each corner of the cube, bidirectional communication lines for passing data messages along the cube, and any node in said network being a local node which has its nearest nodes in said network designated as immediate neighboring nodes, said system comprising:

a dedicated I/O processor at every node assigned only for communication tasks throughout said cube-configured network, with each I/O processor operating independently of every other I/O processor in the network to control its own node's data message passing to its own immediate neighboring nodes;

a control line leading from a local node to each immediate neighboring node in said cube-configured network; and means associated with a local node's I/O processor and under control of said local I/O processor for controlling message passing to an immediate neighboring node independently of message passing activity in other 'nodes'.

13. A system in accordance with claim 12 wherein data messages to be routed through said hypercube-configured network are each preceeded by a destination address, and further comprising:

means at each node associated with the dedicated I/O at that node for reading the destination address from each data message in each node; and means responsive to said destination address read by said reading means for either leaving the message at the local node or for transferring the data message to one of said immediate neighboring nodes as indicated by said destination address.

14. A system in accordance with claim 12 and further comprising:

transceivers at each node connected between each node and the bidirectional communication line connected to said immediate nodes, with said transceivers being setable to a receive or a transmit state; and means at each node associated with the dedicated I/O at that node for controlling the state of that node's transceivers and the state of the transceivers at said immediate neighboring nodes as required for said message passing activity.

15. A system in accordance with claim 14 and further comprising:

means at each node associated with each of said transceivers, when said transceivers are in a transmit state, for directly applying data from said local node to said bidirectional communication lines.

16. A system in accordance with claim 15 and further comprising:
a local message storage means at each node; and
means for storing at a local node a signal indicative of a full or empty status of that node's local storage means.

17. A system in accordance with claim 16 and further comprising:
means at a local node for applying to an immediate neighboring node, a signal indicating that the status of a local storage means assigned to that neighboring node is available to receive a data message from an inquiring node.

18. A system in accordance with claim 14 and further comprising:
means at a local node responsive to the transmit state at any one of said transceivers for storing said state as a channel busy indication to an immediate neighboring node that the status for the bidirectional communication lines between the local node and said neighbor node is busy.

19. A system in accordance with claim 18 and further comprising:
a microsequencer associated with a dedicated local I/O processor and responsive to an absence of a channel busy signal from a transceiver at said destination address for immediately latching said transceiver to a transmit state when a data message is to be sent over the bidirectional communication lines connected to said transceiver.

20. A system in accordance with claim 19 and further comprising:
means at a local node for storing said channel latch signal associated with each transceiver; and
means at a local node for supplying said channel latch signals from said local node to an immediate neighboring node which is connected to said transceiver.

21. A system in accordance with claim 20 and further comprising:
means at a local node for receiving, from all immediate neighboring nodes, signals indicative of an empty message storage means at said immediate neighboring node(s); and
control means supplying a message-loading clock to said empty storage means at said immediate neighboring node(s) for loading data supplied from a local node into said storage means at said immediate neighboring node.

22. A system in accordance with claim 17 wherein:
a dedicated I/O processor at said immediate neighboring node responds to said local-storage-means-empty signal received from said local node for loading said storage means at said local node under control of said dedicated I/O processor at said neighboring node.

* * * * *

UNITED STATES PATENT AND TRADEMARK OFFICE
CERTIFICATE OF CORRECTION

PATENT NO. : 4,814,980

DATED : March 21, 1989

INVENTOR(S) : Peterson et al

It is certified that error appears in the above-identified patent and that said Letters Patent is hereby corrected as shown below:

Column 2, line 5, "node is" should read --node's--.

Column 3, line 62, before "Note" should be five spaces to indicate a new paragraph.

Column 4, line 37, "exclusive or" should read --Exclusive Or--.

Column 5, line 14, after "associated" should be --with--.

Column 7, line 49, with the word "All" there should be a new paragraph starting with the word "All".

Column 7, line 56, after "("2nd" delete "-".

Column 7, line 57, after "("2nd" delete "-".

Column 9, line 28, "("EXOR")" should read --("EX OR")--.

Column 11, line 8, "(FIG.86)" should read --(FIG.8c)--.

Column 11, line 50, after "with" delete ",".

UNITED STATES PATENT AND TRADEMARK OFFICE
CERTIFICATE OF CORRECTION

PATENT NO. : 4,814,980

DATED : March 21, 1989

INVENTOR(S) : Peterson et al

It is certified that error appears in the above-identified patent and that said Letters Patent is hereby corrected as shown below:

Column 12, line 45, "through" should read --throughout--.

Column 13, line 63, "cubes" should read --cube--.

Column 14, line 44, "through" should read --throughout--.

Column 8, line 6, the word "FIG." should start a new paragraph.

Column 8, line 59, the word "FIG." should start a new paragraph.

Signed and Sealed this

Thirty-first Day of March, 1992

Attest:

HARRY F. MANBECK, JR.

Attesting Officer

Commissioner of Patents and Trademarks